United States Patent [19]
Newsome et al.

[11] Patent Number: 5,520,207
[45] Date of Patent: May 28, 1996

[54] REMOTELY MONITORED TAMPER BAR FOR A BACKFLOW PREVENTER

[75] Inventors: Richard F. Newsome, Horsham, Pa.; Gary Peterson, Huntington Beach, Calif.; Carmine Schiavone, Royersford, Pa.

[73] Assignee: Central Sprinkler Corporation, Lansdale, Pa.

[21] Appl. No.: 251,457

[22] Filed: May 31, 1994

[51] Int. Cl.⁶ ................................................. F16K 37/00
[52] U.S. Cl. ........................... 137/15; 137/382; 137/559; 251/90
[58] Field of Search ..................... 137/559, 382, 137/385, 15; 251/90

[56] References Cited

U.S. PATENT DOCUMENTS

| | | |
|---|---|---|
| 542,642 | 7/1895 | Heyman . |
| 542,643 | 7/1895 | Heyman . |
| 991,216 | 5/1911 | Lawrence . |
| 1,087,008 | 2/1914 | Gibson ........................................ 251/90 |
| 1,158,631 | 11/1915 | Caldwell . |
| 1,244,790 | 10/1917 | Stevenson . |
| 1,588,890 | 6/1926 | Horvath . |
| 2,472,793 | 6/1949 | Conterno .................................... 126/42 |
| 3,527,200 | 9/1970 | Baltz et al. ................................ 126/42 |
| 3,980,099 | 9/1976 | Youngblood ............................. 137/382 |
| 4,681,134 | 7/1987 | Paris, Sr. ................................... 137/382 |
| 4,890,638 | 1/1990 | Davenport ................................ 137/382 |
| 4,991,655 | 2/1991 | McHugh ................................... 137/557 |
| 5,152,313 | 10/1992 | Chapman, Jr. ............................ 137/382 |

*Primary Examiner*—A. Michael Chambers
*Attorney, Agent, or Firm*—Panitch Schwarze Jacobs & Nadel

[57] ABSTRACT

A remotely monitored tamper bar apparatus for monitoring two shut-off valve handles of a water supply backflow preventer includes an elongate U-shaped member having a base and two side legs. The base and two side legs form a channel for receiving the handles and to prevent movement of the handles. A switch is operatively associated with the U-shaped member. The switch has a first position which maintains the handles within the channel and a second position which allows the U-shaped member to be removed from the handles such that movement of the handles is permitted. The switch provides a signal for remotely monitoring whether the switch is in the first position or the second position.

8 Claims, 4 Drawing Sheets

REMOTELY MONITORED TAMPER BAR FOR A BACKFLOW PREVENTER

FIELD OF THE INVENTION

The present invention relates to water supply backflow preventer devices and, more particularly, to a remotely monitored tamper bar apparatus and method for monitoring the valve handles of a water supply backflow preventer device.

BACKGROUND OF THE INVENTION

Backflow preventers prevent backflow of toxic contaminants or pollutants into a potable water supply. Backflow preventers are used on potable water lines where a health hazard could exist if a backflow or back siphonage of contaminated water were to occur. If after passing through the backflow preventer the water becomes or may become contaminated, a backflow preventer prevents the water from backing up or returning to, and thus contaminating, the potable water supply. Backflow preventer devices are often required when the same water supply is used for both public usage (i.e. tap water, bathing water, etc.) and for fire protection systems (i.e. sprinkler systems). Backflow preventers are also used when a separate water supply is provided for public usage and fire protection systems, in either or both of the separate water lines which feed the public usage and the fire protection system.

A backflow preventer device generally consists of at least a double check valve assembly, two shut-off valves, and a plurality of test cocks. The shut off valves are positioned on the upstream and down stream sides of the double check valve assembly. With respect to backflow preventers which are installed in the water supply line for the fire protection system, there exists a need to insure that unauthorized persons do not tamper with the shut-off valves, that authorized persons, such as plumbers, who have closed the shut off valves to work on the fire protection system do not forget to turn the shut-off valves to the open position after the work is complete.

At present, a chain and a padlock are often used to lock the shut-off valve handles of the backflow preventer in an open position to prevent unauthorized movement of the valve handles. However, this method of preventing unauthorized persons from accessing the valve handles does not provide for remotely monitoring whether the position of the valve handles may be changed.

In the case where a common water supply is used for both public usage and fire protection systems, it will generally be known when the water supply has been shut-off, since public users will be alerted to the shut off when they attempt to access the water. In this case, the present invention is useful in assisting the prevention of vandals or unauthorized persons from shutting off the water supply at the backflow preventer device when the public users are not in the building or when the public users are not ordinarily using water, such as between the hours of 12:00 AM and 5:00 AM.

The present invention is primarily directed to the case where separate water supply lines supply water for public usage and fire protection systems. In this case, it is possible that an authorized person (e.g. a plumber) who has turned the water off to work on the line may inadvertently forget to turn the water back on, which condition may not be noticed until water is required to prevent or put out a fire. If the water is not available at that time, the results could be disastrous. The present invention also detects whether unauthorized persons or vandals could shut off the fire protection system water, so that the shut-off valves can be checked and, if necessary, placed in the open position, hopefully prior to an emergency situation occurring. Further, the present invention is capable of working under adverse conditions and in wet environments.

The present invention provides a tamper bar which discourages tampering with a backflow preventer valve and monitors the condition of the tamper bar with a switch. The switch provides a signal which can be remotely monitored, for instance, at a central station. In some areas this will allow a common water supply for a fire protection system and a potable water system.

SUMMARY OF THE INVENTION

Briefly stated, the present invention is a remotely monitored tamper bar apparatus for monitoring two shut-off valve handles of a water supply backflow preventer device. The tamper bar apparatus comprises an elongate U-shaped member having a base and two side legs. The base and two side legs form a channel therebetween for receiving the handles and to prevent movement of the handles. A switch operatively associated with the U-shaped member has a first position which maintains the handles within the channel and a second position which allows the U-shaped member to be removed from the handles. The switch provides a signal for remotely monitoring whether the switch is in the first position or the second position.

The present invention also provides a method of remotely monitoring two shut-off valve handles of a water supply backflow preventer device. The method comprises the steps of positioning an elongate U-shaped member having a base and two side legs, the base and two side legs forming a channel therebetween, such that the handles are located within the channel to prevent movement of the handles; positioning a switch proximate to the U-shaped member, the switch having a first position which prevents movement of the U-shaped member and a second position which allows the U-shaped member to be removed from the handles such that movement of the handles is permitted, the switch providing a signal for remotely monitoring whether the switch is in the first position or the second position; placing the switch in the first position; and remotely monitoring the signal to determine whether the switch is in the first position or the second position.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangement and instrumentality shown. In the drawings.

DETAILED DESCRIPTION OF THE PREFERRED EMBODIMENT

Certain terminology is used in the following description for convenience only and is not limiting. The words "inwardly" and "outwardly" refer to directions towards and away from, respectively, the geometric center of the remotely monitored tamper bar apparatus and designated parts thereof. The terminology includes the words above specifically mentioned, derivatives thereof and words of similar import.

Figure 1:
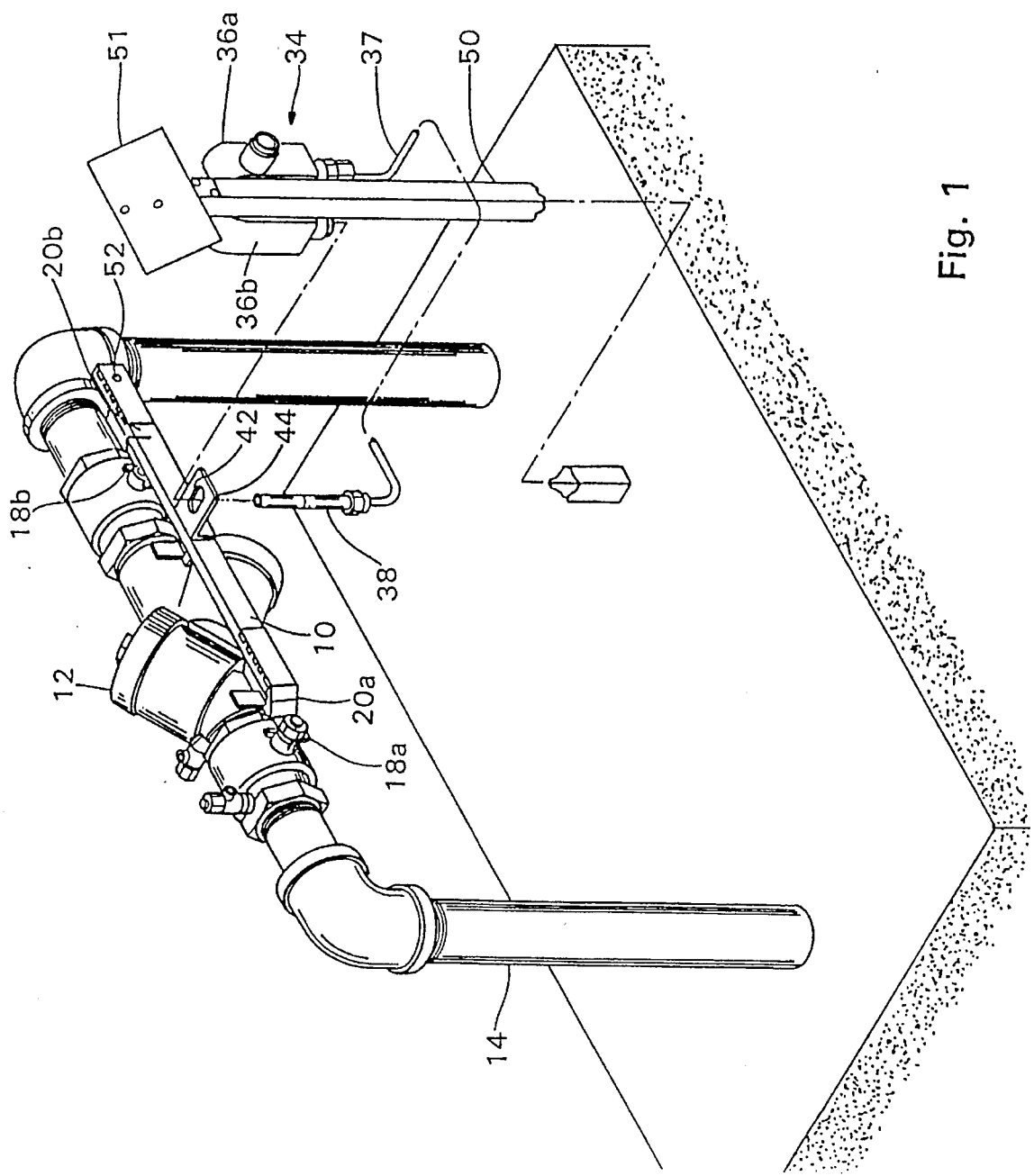
FIG. 1 is a perspective view of a combination water supply backflow preventer and a remotely monitored tamper bar apparatus in accordance with the present invention.
Figure 2:
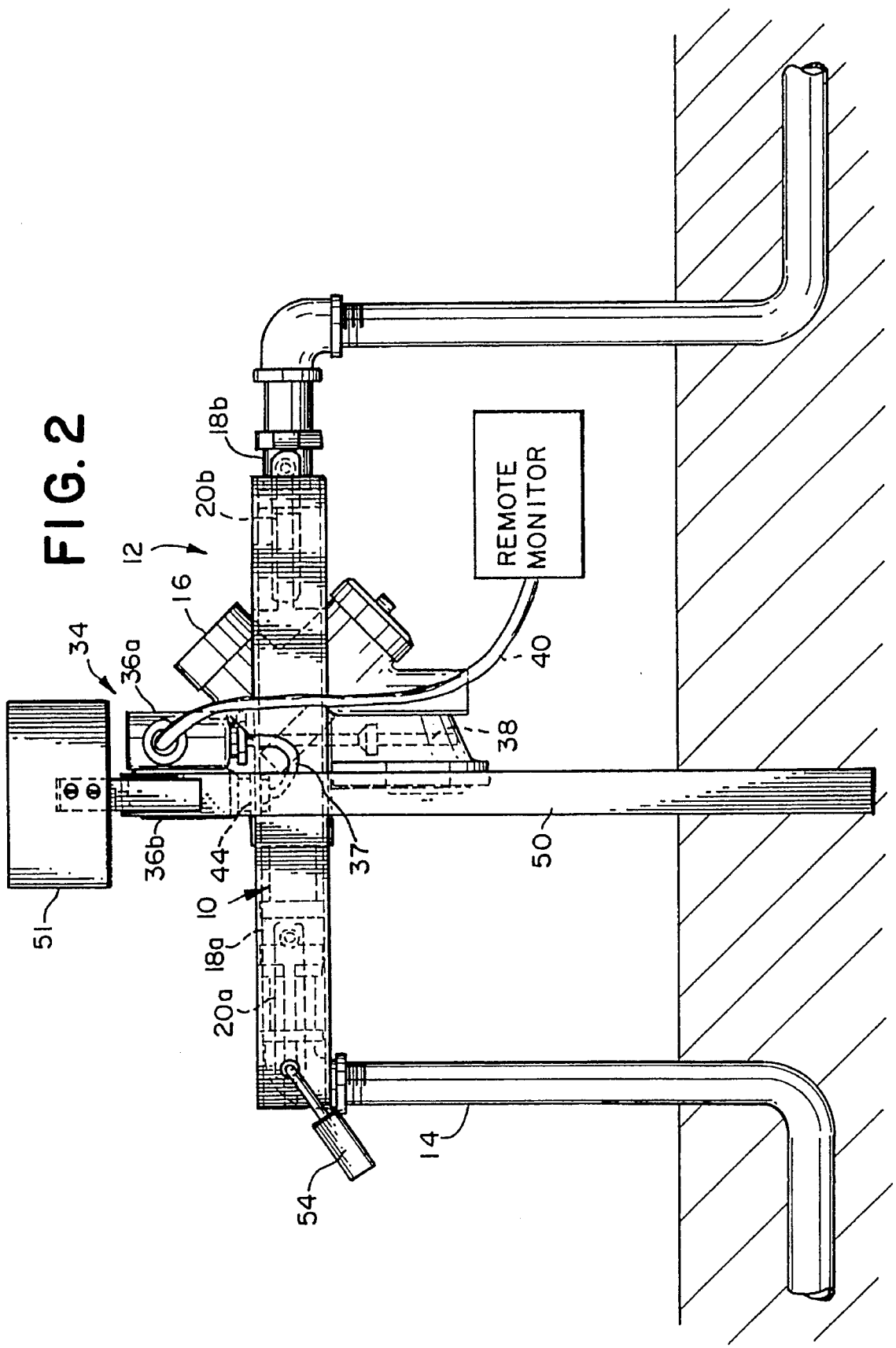
FIG. 2 is a side view, partially in cross-section, of the combination water supply backflow preventer and remotely monitored tamper bar apparatus of FIG. 1.
Figure 3:
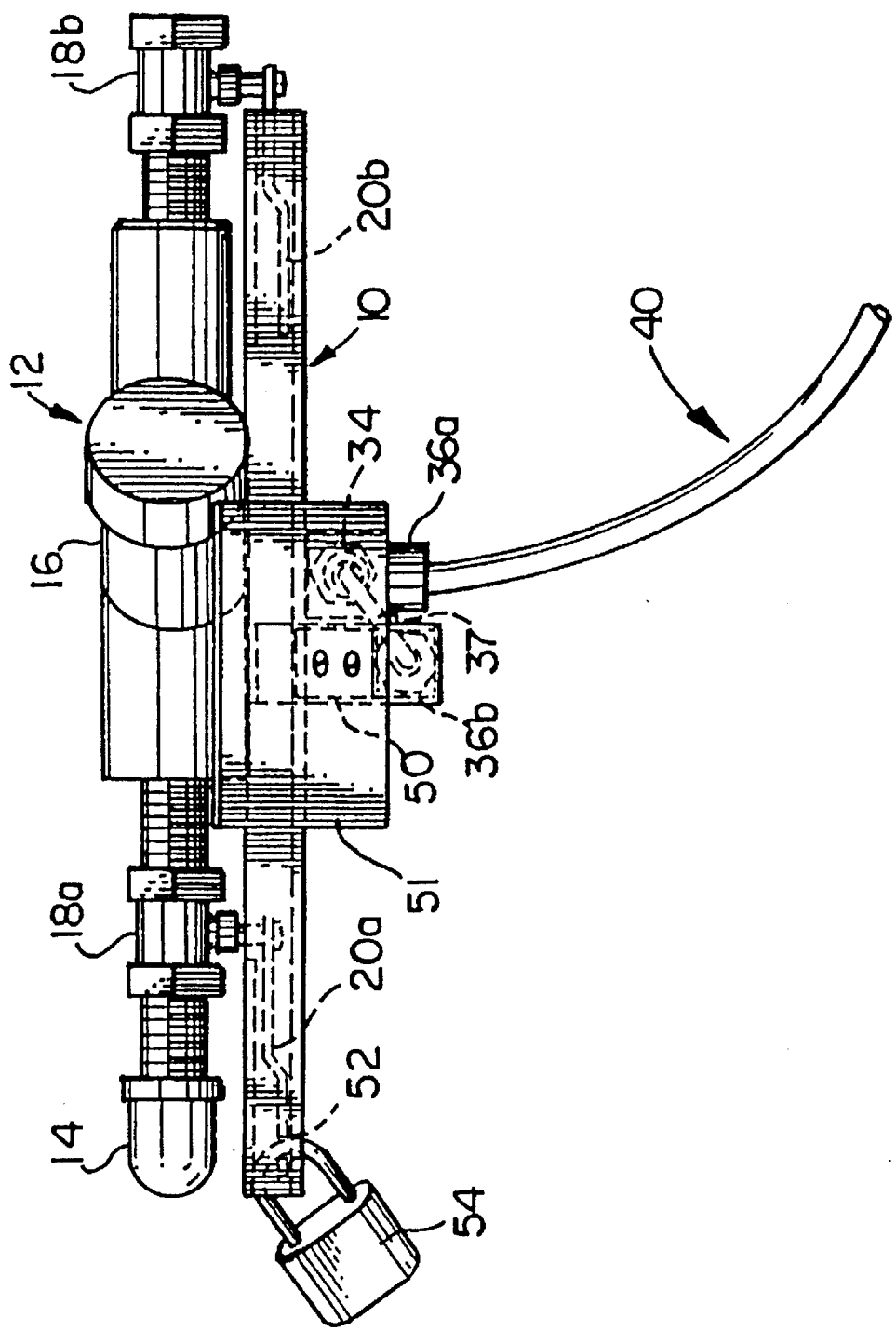
FIG. 3 is a top plan view of the combination water supply backflow preventer and remotely monitored tamper bar apparatus of FIG. 1.

Referring now to the drawings in detail, wherein like numerals indicate like elements throughout, there is shown in FIGS. 1–3 a presently preferred embodiment of a remotely monitored tamper bar apparatus, indicated generally at 10, mounted on a water supply backflow preventer device 12. Generally, the backflow preventer device 12 is installed in a water supply line 14 and includes a double check valve assembly 16, and two shut-off valves 18a, 18b. Each valve 18a, 18b has a corresponding shut-off valve handle 20a, 20b. Double check backflow preventer devices are well known to those of ordinary skill in the art and are readily available from a variety of manufacturers. One such backflow preventer device is the Model 550 available from Wilkins, a division of Zurn Industries, Inc. of Paso Robles, Calif. It is understood by those skilled in the art from this disclosure that the present invention is not limited to installing the tamper bar apparatus 10 on any particular backflow preventer device.

The presently preferred embodiment of the tamper bar apparatus 10 of the present invention is directed to a backflow preventer device 12 having side mounted shut-off valve handles 20a, 20b. However, it should be apparent to those of ordinary skill in the art from this disclosure that the present invention is not limited to backflow preventers with side mounted shut-off valve handles. For instance, the present invention could be modified to work with a backflow preventer device having its shut-off valve handles located on either a top or bottom thereof.

The tamper bar apparatus 10 of the present invention is designed to be slidably disposed over the two shut-off valve handles 20a, 20b when the valve handles 20a, 20b are in an open position in order to prevent the handles 20a, 20b from being moved to the closed position. The tamper bar apparatus 10 further provides a means for remotely monitoring the position of the tamper bar apparatus 10, as described in more detail hereinafter.

Figure 4:
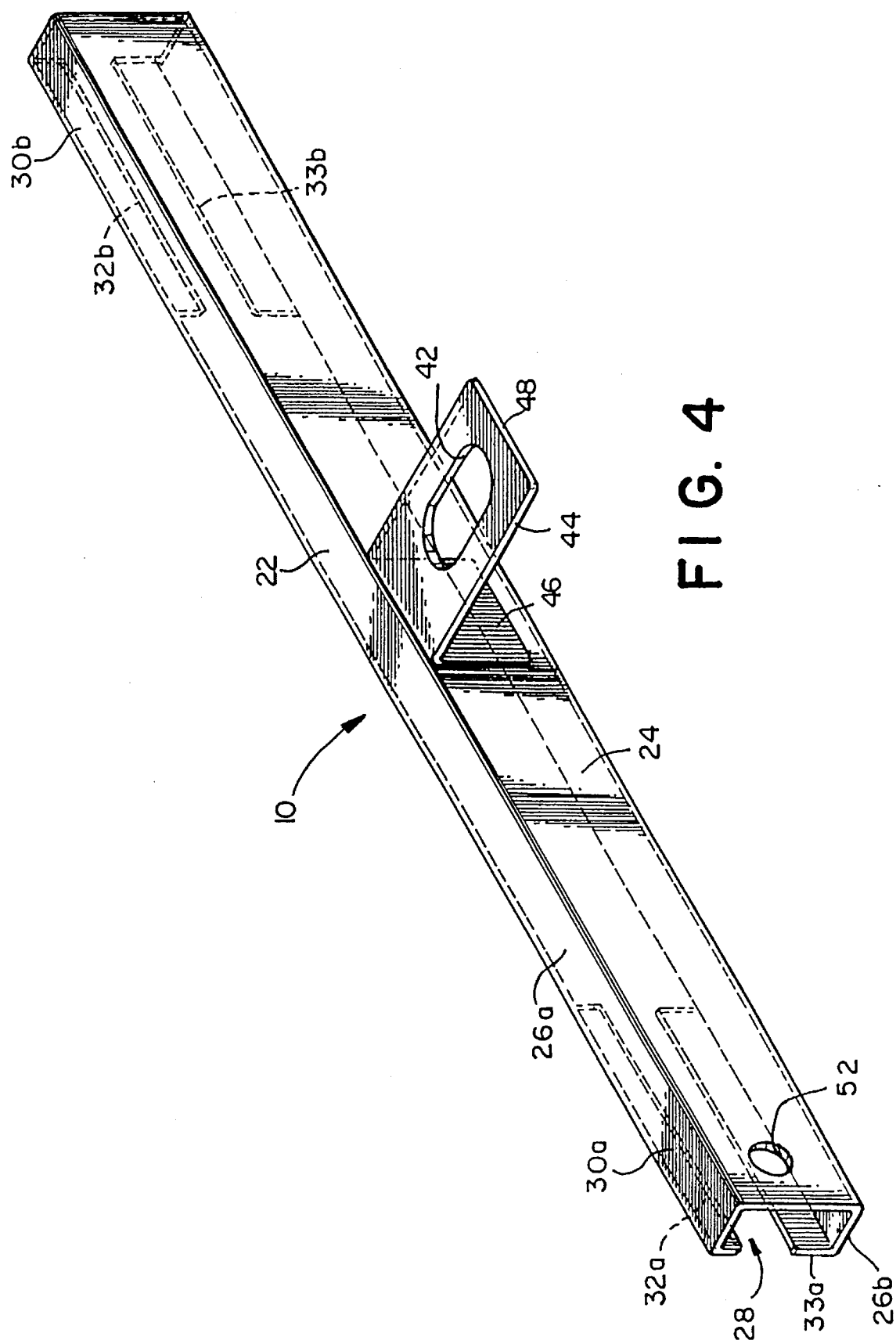
FIG. 4 is an enlarged perspective view of the tamper bar of the tamper bar apparatus shown in FIG. 1.

Referring now to FIG. 4, the tamper bar apparatus 10 comprises an elongate U-shaped member 22 having a base 24 and two side legs 26a, 26b. The two side legs 26a, 26b extend at a generally right angle from the base 24. The base 24 and the two side legs 26a, 26b form a channel 28 therebetween. The channel 28 is sized to receive the handles 20a, 20b and to prevent movement of the handles 20a, 20b when installed thereon. The U-shaped member 22 includes two end sections 30a, 30b. At least one of the end sections 30a, 30b is open. In the presently preferred embodiment, both of the end sections 30a, 30b are open. Thus, the U-shaped member 22 may be slidably disposed over (or slidably removed from) the handles 20a, 20b from either lateral direction. The U-shaped member 22 further comprises an inwardly extending flange 32a/32b, 33a/33b on each leg 26a, 26b, respectively proximate both of the end sections 30a, 30b. The flanges 32a/32b, 33a/33b extend generally perpendicularly from the side legs 26a, 26b, and further define the channel 28 formed between the side legs 26a, 26b such that the channel 28 is sized to receive a handle 20a, 20b of the backflow preventer 12. That is, the U-shaped member 22 sufficiently surrounds the handles 20a, 20b so that the U-shaped member 22 can only be slidably disposed on the handles 20a, 20b. Accordingly, when the U-shaped member 22 is positioned over the handles 20a, 20b, the handles 20a, 20b may not be accessed or rotated.

In the presently preferred embodiment, the U-shaped member 22 is fabricated from a high strength, light weight material, such as sheet metal (16 gauge) which is machined to an appropriately shaped blank and then bent to the configuration shown in FIG. 4. It is understood by those skilled in the art from this disclosure that the present invention is not limited to fabricating the U-shaped member 22 from any particular material. For instance, in lieu of sheet metal, other forms of metal, composites and manufacturing methods, such as molding, could be used to form or fabricate the U-shaped member 22.

The purpose of the tamper bar apparatus 10 is to manually lock the shut-off valve handles 20a, 20b of the water line backflow preventer device 12 in the open position and provide a signal indicative of the condition of the U-shaped member 22 (i.e. whether the U-shaped member 22 can be removed from the handles 20a, 20b) in relation to the shut-off valve handles 20a, 20b. The signal may be monitored from a remote location, such as a central station. This allows for a water supply to be used for a fire protection system without fear of the supply being unknowingly shut off.

Referring now to FIGS. 1–3, a switch 34 is operatively associated with the U-shaped member 22. The switch 34 has a first position (shown in solid in FIGS. 2 and 3) which maintains the handles 20a, 20b within the channel 28 and a second position (shown in phantom in FIG. 2) which allows the U-shaped member 22 to be removed from the handles 20a, 20b such that movement of the handles 20a, 20b is permitted. The switch 34 provides a signal which can be remotely monitored from a central station (not shown) indicating whether the switch 34 is in the first position or the second position. It is understood by those skilled in the art from this disclosure that the present invention is not limited to providing a signal which may be remotely monitored at a central station indicating the position of the switch 34. For instance, in lieu of, or in addition to providing a remotely monitored signal, the switch could sound a local alarm, having audio and/or visual components.

In the presently preferred embodiment, the switch 34 comprises a plug magnetic switch, such as those available from Potter Electric Switch Co., of St Louis, Mo. A plug magnetic switch is used since these switches are particularly useful in wet locations. It is understood by those skilled in the art from this disclosure that the present invention is not limited to any particular switch assembly, since many other known types of switch assemblies may be used to provide remote and/or local monitoring capability, such as contact or optical switch assemblies.

Generally, plug magnetic switches comprise a glass magnetic reed switch sealed in a stainless steel tube. A first condulet fitting connects the switch to an external circuit via a cable and a second condulet fitting houses a magnet and serves as a receptacle for the stainless steel tube. FIGS. 1–3 show the plug magnetic switch 34 having first and second condulets 36a, 36b, an interconnected flexible cable 37, a tube 38 extending between the condulets 36*a*, 36*b*, and a cable 40 extending from the first condulet 36*a* to a schematically illustrated remote site or central station at which the position of the switch 34 can be monitored. A portion of the plug magnetic switch 34, (i.e. the tube 38) is interlocked with the U-shaped member 22 when the switch 34 is in the first position and the tube 38 of the plug magnetic switch 34 is not interlocked with the U-shaped member 22 when the switch 34 is in the second position.

As shown in FIGS. 1–3, in the presently preferred embodiment, the tube 38 is disposed through an aperture 42 in an L-shaped member or bracket 44 affixed to the base 24 of the U-shaped member 22. Referring to FIG. 4, the L-shaped member 44 has a first leg 46 and a second leg 48, which is substantially perpendicular to the first leg 46. As previously discussed, the second leg 48 has an aperture 42 through which the tube 38 is disposed. Thus, as shown in FIGS. 1–3, when the U-shaped member 22 is placed over the valve handles 20*a*, 20*b*, the tube 38 is disposed through the aperture 42 and connected to the second condulet 36*b*, placing the switch 34 in the first position. When the tube 38 is not connected to the second condulet 36*b* and not interlocked with the L-shaped member 44, the switch 34 is in the second position and the U-shaped member 22 may be removed from the valve handles 20*a*, 20*b*. A reset circuit can be included at the remote monitoring site which insures that an operator will be notified that the condition of the switch has been altered, i.e. opened and then closed.

In the presently preferred embodiment, the L-shaped member 44 comprises a bent piece of sheet metal with the aperture 42 formed in the second leg 48. The first leg 46 is welded to the base 24 of the U-shaped member 22 at a point generally intermediate the two end sections 30*a*, 30*b*. It should be apparent to those skilled in the art from this disclosure that position of the U-shaped member 22 may be monitored by means other than disposing the tube 38 through an aperture in a bracket affixed to the U-shaped member 22. For instance, a bore for receiving the tube 38 could be formed directly in the U-shaped member 22.

In the presently preferred embodiment, a bar 50 is installed in the ground below the backflow preventer device 12. The bar 50 extends from a secure mooring in the ground up to and beyond the backflow preventer device 12. The bar 50 is placed sufficiently in the ground to prevent lifting of the bar 50 to allow any movement of the U-shaped member 22 to expose a valve handle 20*a*, 20*b* without moving the switch 34 to the second position. The bar 50 holds the two condulet fittings 36*a*, 36*b* of the plug magnetic switch 34, in such a manner that the tube 38 can be fed through the L-shaped member 44 on the U-shaped member 22, and then inserted into a receptacle on the second condulet 36*b*, thus interlocking the U-shaped member 22 and the switch 34. To remove the U-shaped member 22 from the handles 20*a*, 20*b*, the tube 38 must be pulled straight out of the receptacle, and away from the magnet, causing the switch contacts to transfer. The changing position of the switch 34 can be used to notify a monitor at a central station. That is, the U-shaped member 22 cannot be removed from the handles 20*a*, 20*b* without removing the tube 38. If the tube 38 is removed, the switch 34 transfers and a signal is produced. It should be apparent to those of ordinary skill in the art that the tamper bar apparatus 10 could provide a signal indicative of either the presence or absence of the U-shaped member 22 covering the valve handles 20*a*, 20*b*. The orientation of the switch assembly 34 makes it easy for installation, locking, and removal of the U-shaped member 22. The bar 50 may be optionally outfitted with a sign 51 to designate the purpose and precise location of the particular backflow preventer device 12, as well as other information deemed necessary. Although the present invention is shown using the bar 50 extending from the ground to the backflow preventer device 12 for securing the switch assembly 34 thereto, it is apparent to those skilled in the art that the bar 50 is not a necessary element of the invention and the use of the invention is not limited to requiring the bar 50 to hold the plug magnetic switch 34. For instance, a bracket (not shown) could be placed between the backflow preventer device 12 and the plug magnetic switch 34 to support the switch 34. Further, if other types of switches are used which do not comprise two separate housings and a tube therebetween, the bar 50 may not be necessary.

In the preferred embodiment of the present invention, the tamper bar apparatus 10 further comprises a locking member 54 extending between the U-shaped member 22 and the backflow preventer device 12 to lock the U-shaped member 22 to the backflow preventer device 12. A hole or bore 52 is provided in one end section 30*a* or 30*b* to allow the U-shaped member 22 to be padlocked or otherwise secured to the handles 20*a*, 20*b*. As shown in FIGS. 2 and 3, an ordinary or heavy duty padlock 54 can be used to lock the U-shaped member 22 to the backflow preventer device 12 by passing the lock 54 through the hole 52 and through a hole (not shown) drilled through one of the shut-off valve handles 20*a*, 20*b*.

In the operation of the presently preferred embodiment, the switch assembly 34 should be positioned and mounted next to the backflow preventer device 12 piping. With the shut-off valve handles 20*a*, 20*b* in the open position, the U-shaped member 22 is positioned over the valve handles 20*a*, 20*b*, preventing them from being closed. Then, the switch tube 38 is inserted through the aperture 42 in the L-shaped member 44 on the U-shaped member 22 and into the second condulet 36*b* allowing electrical remote monitoring. The padlock 54, by means of the hole 52 in one of the end sections 30*a*, 30*b* of the U-shaped member 22 and a hole drilled through one of the shut-off valve handles corresponding to the hole 52 in the U-shaped member 22, is used to lock the U-shaped member 22 to one of the handles 20*a*, 20*b* for additional security.

The present invention further provides a method of remotely monitoring the two shut-off valve handles 20*a*, 20*b* of the water supply backflow preventer device 12. The method comprises positioning the elongate U-shaped member 22 such that the handles 20*a*, 20*b* are located within the channel 28 to prevent movement of the handles 20*a*, 20*b*. The switch 34 is then positioned proximate to the U-shaped member 22. As previously discussed, the switch 34 has a first position which prevents movement of the U-shaped member 22 and a second position which allows the U-shaped member 22 to be removed from the handles 20*a*, 20*b* such that movement of the handles 20*a*, 20*b* is permitted. The switch 34 provides a signal for remotely monitoring whether the switch 34 is in the first position or the second position. The switch 34 is placed in the first position and the signal is remotely monitored to determine whether the switch 34 is in the first position or the second position.

In addition, the method can include the step of locking the U-shaped member 22 to the backflow preventer device 12 with the locking member 54 extending between the U-shaped member 22 and the backflow preventer device 12, in the manner previously discussed.

From the foregoing description, it can be seen that the present invention provides a combination water supply backflow preventer device 12 and a remotely monitored tamper bar apparatus 10 for monitoring two shut-off valve handles of the water supply backflow preventer device 12. The tamper bar apparatus 10 is used for preventing accidental, mischievous, or unlawful access to the shut-off valve handles 20a, 20b of the water supply backflow preventer device 12. The tamper bar apparatus 10 provides for easy installation and locking, and inexpensive monitoring. Further, the tamper bar apparatus 10 can be easily and efficiently manufactured. It will be appreciated that changes and modifications may be made to the above described embodiment without departing from the inventive concept thereof. Therefore, it is understood that the present invention is not limited to the particular embodiment disclosed, but is intended to include all modifications and changes which are within the scope and spirit of the invention as defined by the appended claims.

We claim:

1. A method of remotely monitoring two shut-off valve handles of a water supply backflow preventer device, comprising the steps of:

positioning an elongate U-shaped member having a base and two side legs, the base and two side legs forming a channel therebetween, such that the handles are located within the channel to prevent movement of the handles;

positioning a switch proximate to the U-shaped member, the switch having a first position which prevents movement of the U-shaped member and a second position which allows the U-shaped member to be removed from the handles such that movement of the handles is permitted, the switch providing a signal for remotely monitoring whether the switch is in the first position or the second position;

placing the switch in the first position; and remotely monitoring the signal to determine whether the switch is in the first position or the second position.

2. The method of claim 1 further comprising the step of locking the U-shaped member to the backflow preventer device with a locking member extending between the U-shaped member and the backflow preventer device.

3. A combination water supply backflow preventer and a remotely monitored tamper bar apparatus for monitoring two shut-off valve handles of the water supply backflow preventer, the combination comprising:

a backflow preventer having two valves, each valve having a corresponding valve handle;

an elongate U-shaped member having a base and two side legs, the base and two side legs forming a channel therebetween for receiving the handles and to prevent movement of the handles; and a switch operatively associated with the U-shaped member having a first position which maintains the handles within the channel and a second position which allows the U-shaped member to be removed from the handles such that movement of the handles is permitted, the switch providing a signal for remotely monitoring whether the switch is in the first position or the second position.

4. The apparatus of claim 3 wherein the switch comprises a plug magnetic switch, a portion of the plug magnetic switch is interlocked with the U-shaped member when the switch is in the first position, and said portion of the plug magnetic switch is not interlocked with the U-shaped member when the switch is in the second position.

5. The apparatus of claim 3 wherein the U-shaped member includes two end sections, at least one of which is open, said U-shaped member further comprising an inwardly extending flange on each leg proximate both of the end sections, the flanges further defining the channel such that the U-shaped member sufficiently surrounds the handles so that the U-shaped member can only be slidably disposed on the handles.

6. The apparatus of claim 5 further comprising a locking member extending between the U-shaped member and the backflow preventer device to lock the U-shaped member to the backflow preventer device.

7. The apparatus of claim 5 further comprising an L-shaped bracket having a first section and a second section, the second section having a bore formed therein, the first section being affixed to the U-shaped member.

8. The apparatus of claim 7 wherein the switch comprises a plug magnetic switch and the bore in the L-shaped member is interlocked with a portion of the plug magnetic switch when the switch is in the first position, and said portion of the plug magnetic switch is not interlocked with the L-shaped member when the switch is in the second position.

* * * * *